No. 621,768. Patented Mar. 21, 1899.
T. W. HILL.
FILTER FOR WATER, &c.
(Application filed May 19, 1898.)
(No Model.)
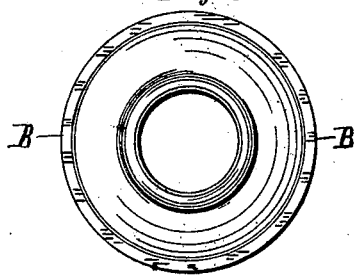
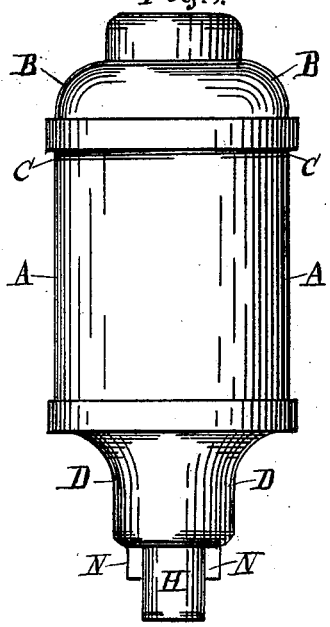
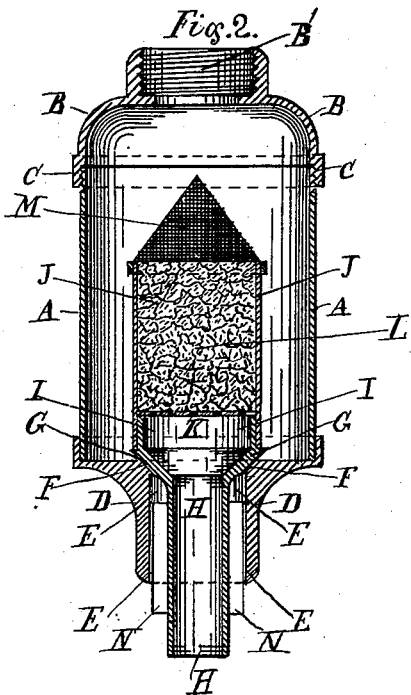
Witnesses.
John Satterwhite
W. S. Daubenspeck
Inventor.
Thomas W. Hill
By St. John Day.
Attorney.

UNITED STATES PATENT OFFICE.

THOMAS W. HILL, OF LOS ANGELES, CALIFORNIA.

FILTER FOR WATER, &c.

SPECIFICATION forming part of Letters Patent No. 621,768, dated March 21, 1899.

Application filed May 19, 1898. Serial No. 681,170. (No model.)

*To all whom it may concern:*

Be it known that I, THOMAS W. HILL, of the city of Los Angeles, in the county of Los Angeles and State of California, have invented certain new and useful Improvements in Filters for Water and other Liquids, of which the following is a full, clear, and exact description or specification, reference being had to the accompanying sheet of drawings and to the letters marked thereon.

My invention, which consists of an improved filter for water and other liquids, relates to that class of filters which are attached to a tap or cock connected by pipe to the source of supply of said liquid.

For convenience of description I hereinafter refer to my new or improved filter as of that class which is either screwed onto or otherwise suitably attached to an ordinary tap or cock by which water is drawn off for domestic or other purposes and through which the water flows as it escapes from said cock or tap.

The main object of my invention is to enable all matter or substance which has become separated from the water by the action of the filter, and which is therefore retained or accumulated in the filter to be removed from the filter whenever required, so that the filter shall not become clogged thereby or rendered inoperative through such accumulation of separated matter.

Another object of my invention is to enable the separated matter to be removed from the filter without detaching the said filter from the tap or cock and by causing the water to flush the filter whenever desired, the flushing action washing out the accumulated or separated matter. For this purpose the lower part of the filter-casing is furnished with a valve which normally rests upon a valve-seat in the lower part of the casing and closes it. This valve is provided at its upper part with a receptacle which contains the filtering material, such as charcoal. The charcoal rests upon a perforated plate in the lower part of this receptacle, and the upper part of the receptacle is covered with wire-gauze, (preferably a cone of wire-gauze,) through which the water passes to the filtering material below. The filtering action is such that the water which passes through the wire-gauze, filtering substance, and perforated plate escapes through the stem of the valve, which is made hollow or tubular, and the more or less solid or impure matter which is separated from the water by the filtering action collects in the casing above the valve-seat. The stem of the valve is of less diameter than the cylindrical hole in the bottom of the casing through which it passes, and it is maintained vertically and centrally therein by wings or feathers, so that open spaces are left between these wings or feathers, the outside of the valve-stem, and the inside of the cylindrical hole in the lower part of the casing.

When it is desired to remove the separated matter from the interior of the casing, all that is necessary is to apply the finger to the projecting bottom part of the valve-stem, and thence to push the valve upward from off its seat, when on opening the tap or cock the escaping water washes out the separated matter by causing it to flow downward between the valve and valve-seat and to be discharged through the spaces between the outside of the valve-stem and the inside of the cylindrical opening.

On the annexed drawings, Figure 1 is an elevation of my filter. Fig. 2 is a vertical section of same. Fig. 3 is a plan.

In the drawings the cylindrical casing of the filter is marked A, to which the upper part B is attached by a screw-thread cut on the cylindrical part A. The lower part D may also be attached to the bottom of the cylindrical casing A by a screw-thread similar to C; but it is preferably soldered or sweated thereon. In the upper part B a screw-thread B' is cut, as shown, for attaching the filter to the screwed nose of the water-supply tap or cock. The bottom part D is constructed with the cylindrical opening E and conical valve-seat F, upon which the valve G rests. The valve G is hollow, as shown, as also is its stem H. On the upwardly-projecting cylindrical part I of the valve G the receptacle J is fastened, and the perforated plate K forms a bottom to the receptacle J, upon which the charcoal L or other filtering material rests. The top of the receptacle J is covered by the cone of wire-gauze M.

The tubular valve-stem H is provided with three or more wings or feathers N for guiding or maintaining its position in the tubular bottom D. When in action, the water to be filtered passes down through the wire-gauze cap M, thence through the charcoal, thence through the perforations in the plate K, and thence through the tubular valve-stem H, whence it is discharged as filtered water. The solid or other matter separated from the water collects within the casing A, above the valve-seat F, and around the valve G.

When it is desired to remove the separated matter from the filter-casing, all that is necessary is to open the tap or cock to which the filter is attached and then to apply the finger to the lower part of the valve-stem H, when the valve F becomes raised and the flowing water carries the separated matter down between the valve and valve-seat G and F, respectively, and discharges it through the openings formed by the feathers N, the tubular stem H, and the cylindrical bottom E.

Having now described the nature of my said invention and the best system, mode, or manner I am at present acquainted with for carrying the same into practical effect, what I consider as my invention, and desire to be secured to me by Letters Patent, is as follows:

1. The improved filter for attaching to a tap or cock, consisting of a casing, having at its upper part a tap or cock attachment, and at its lower part a valve-seat upon which a hollow valve rests, the upper part of said hollow valve carrying a receptacle for the filtering material, a perforated plate upon which said filtering material rests, a perforated cap above said filtering material—said valve having a tubular stem with extended wings or feathers for maintaining and guiding the position of the valve and parts connected therewith in the cylindrical opening below the valve and valve-seat, all operating together in the manner and for the purpose substantially as set forth.

2. The combination of the outer casing having the lower cylindrical opening, the tap or cock connecting attachment, the valve-seat, the valve, the receptacle above the valve, the filtering material within the receptacle above the valve, the perforated plate below this filtering material, the perforated cap above the filtering material, the tubular valve-stem, the wings or feathers for guiding the valve-stem in the cylindrical opening at the bottom of the casing—the whole operating together in the manner and for the purposes substantially as set forth.

3. The filtering and filter-cleansing device, consisting of the hollow valve and valve-stem, the valve-seat, the receptacle above said valve containing the filtering material, the filtering material and the perforated plate and cap situated below and above the filtering material respectively, substantially as set forth.

In testimony whereof I have hereunto set my hand and seal, this 25th day of April, 1898, in the presence of two subscribing witnesses.

THOMAS W. HILL. [L. S.]

Witnesses:
ST. JOHN DAY,
J. B. WHITTEMORE.